United States Patent
Levan

(10) Patent No.: US 11,981,471 B2
(45) Date of Patent: May 14, 2024

(54) SEAL AND CUT ASSEMBLY FOR HEAT SEALING MACHINE

(71) Applicant: Sonoco Development, Inc., Hartsville, SC (US)

(72) Inventor: Marvin Levan, Steward, IL (US)

(73) Assignee: Sonoco Development, Inc., Hartsville, SC (US)

(*) Notice: Subject to any disclaimer, the term of this patent is extended or adjusted under 35 U.S.C. 154(b) by 0 days.

(21) Appl. No.: 17/522,639

(22) Filed: Nov. 9, 2021

(65) Prior Publication Data

US 2022/0144473 A1 May 12, 2022

Related U.S. Application Data

(60) Provisional application No. 63/111,539, filed on Nov. 9, 2020.

(51) Int. Cl.
| | | |
|---|---|---|
| *B65B 61/06* | (2006.01) | |
| *B29C 65/18* | (2006.01) | |
| *B29C 65/48* | (2006.01) | |
| *B65B 7/28* | (2006.01) | |
| *B65B 9/04* | (2006.01) | |
| *B29L 31/00* | (2006.01) | |

(52) U.S. Cl.
CPC .............. *B65B 61/06* (2013.01); *B29C 65/18* (2013.01); *B29C 65/4835* (2013.01); *B65B 7/2878* (2013.01); *B65B 9/045* (2013.01); *B29L 2031/7164* (2013.01)

(58) Field of Classification Search
None
See application file for complete search history.

(56) References Cited

U.S. PATENT DOCUMENTS

| | | | |
|---|---|---|---|
| 3,988,093 | A | 10/1976 | Birchenough |
| 4,095,397 | A | 6/1978 | Schilte |
| 4,750,318 | A | 6/1988 | Matsuzawa |
| (Continued) | | | |

FOREIGN PATENT DOCUMENTS

| | | | |
|---|---|---|---|
| CN | 106043831 A | * | 10/2016 |
| EP | 1842776 A2 | | 10/2007 |
| (Continued) | | | |

OTHER PUBLICATIONS

International Search Report and Written Opinion related to Application No. PCT/US2021/058630 dated Mar. 7, 2022.

*Primary Examiner* — Tanzim Imam
(74) *Attorney, Agent, or Firm* — von Briesen & Roper, s.c.

(57) ABSTRACT

A heat sealing machine and method form blister packages. A backing material web extends between a nesting tray assembly and a seal and cut tooling assembly and a blister tray is resident within a blister nest of the nesting tray assembly. The backing material web is clamped between a clamping gasket support shoulder of the nesting tray assembly and a clamping shoulder of the seal and cut tooling assembly, and between a sealing gasket support shoulder of the nesting tray assembly and a heat seal shoulder of a heater assembly. A knife of the seal and cut tooling assembly extends between the clamping gasket support shoulder and the sealing gasket support shoulder to cut a backing sheet from the backing material web that is heat sealed to an attachment surface of the blister tray to form the blister package.

7 Claims, 12 Drawing Sheets

(56) References Cited

U.S. PATENT DOCUMENTS

| | | | |
|---|---|---|---|
| 5,329,750 A | 6/1994 | Bagley et al. | |
| 6,129,538 A | 10/2000 | Jones | |
| 6,399,184 B1 | 6/2002 | Jones | |
| 6,409,496 B1 | 6/2002 | Jones | |
| 6,941,729 B2 | 9/2005 | Dal Pozzo | |
| 7,056,405 B2 | 6/2006 | Worden | |
| 10,730,651 B2 | 8/2020 | Green | |
| 2003/0196412 A1 | 10/2003 | Foulke | |
| 2004/0206048 A1* | 10/2004 | Iuchi | B65B 7/164 53/329.2 |
| 2005/0268578 A1 | 12/2005 | Hahnel et al. | |
| 2019/0062032 A1 | 2/2019 | Mader et al. | |

FOREIGN PATENT DOCUMENTS

| | | | |
|---|---|---|---|
| WO | 2016193006 A1 | 12/2016 | |
| WO | WO-2020002934 A1 * | 1/2020 | ....... B29C 66/53461 |

\* cited by examiner

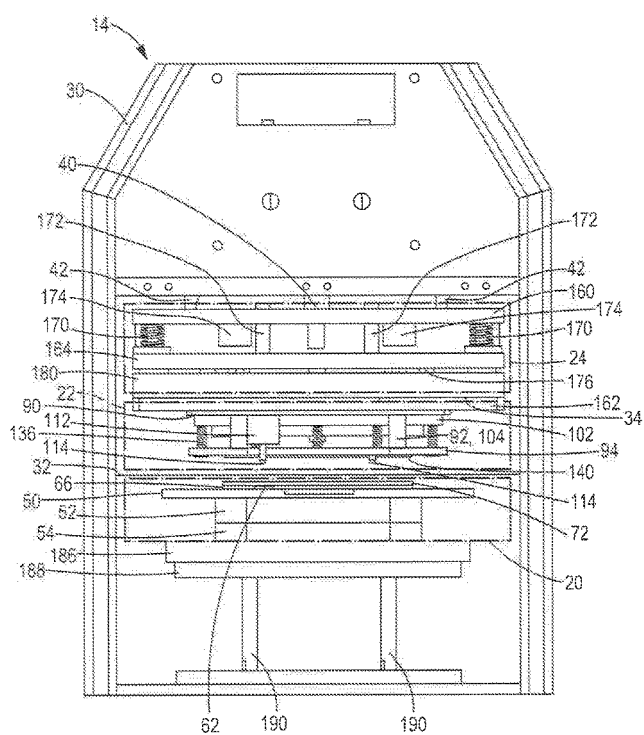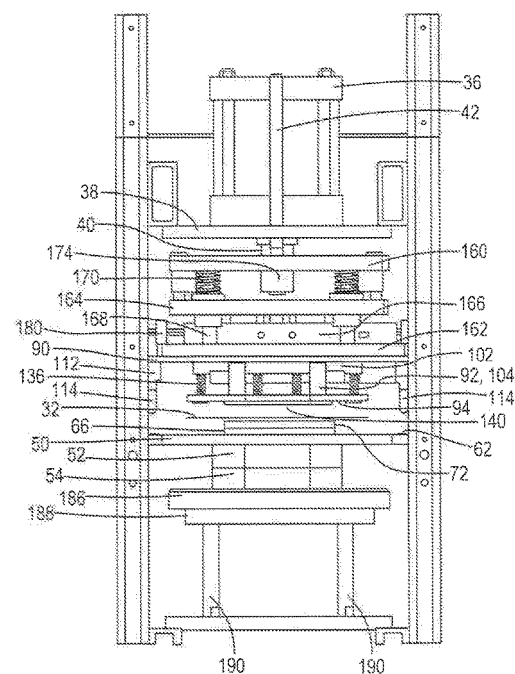
FIG. 3
FIG. 4

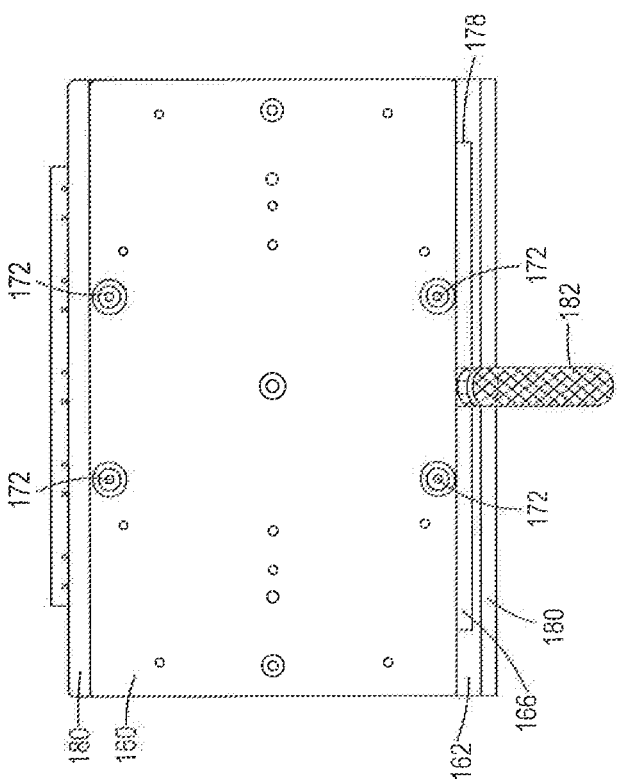
FIG. 11
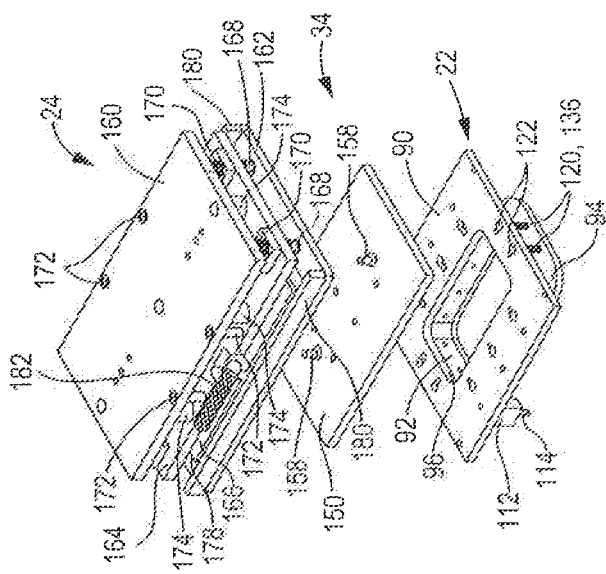
FIG. 10
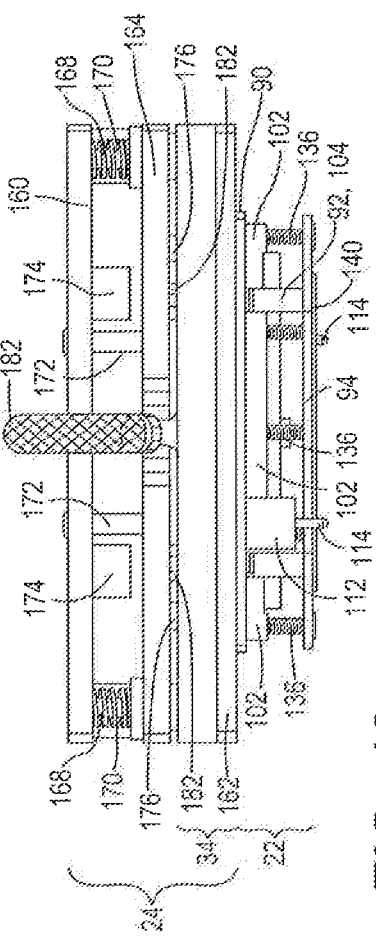
FIG. 12
FIG. 13
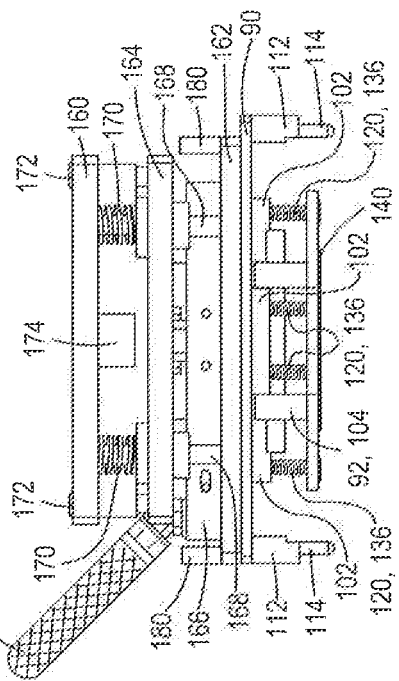

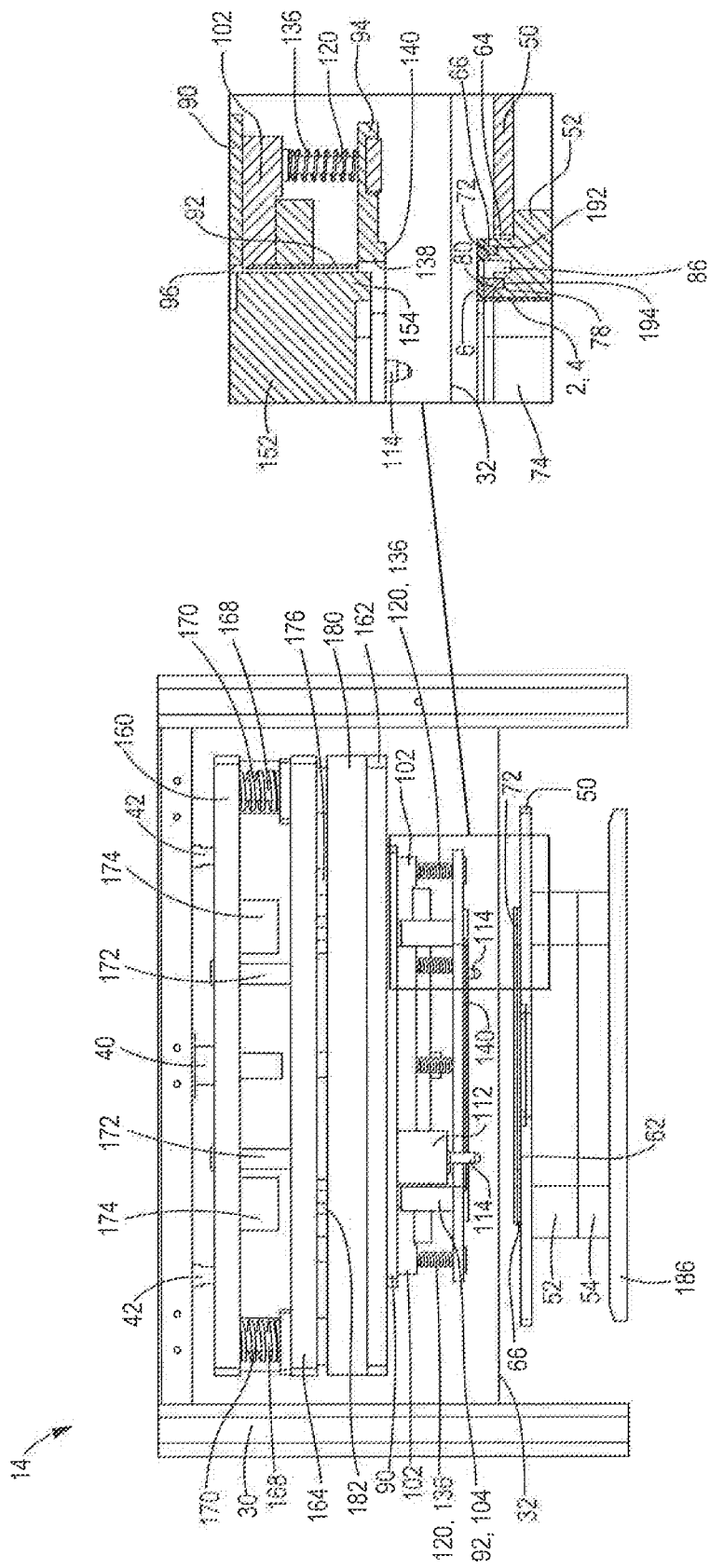

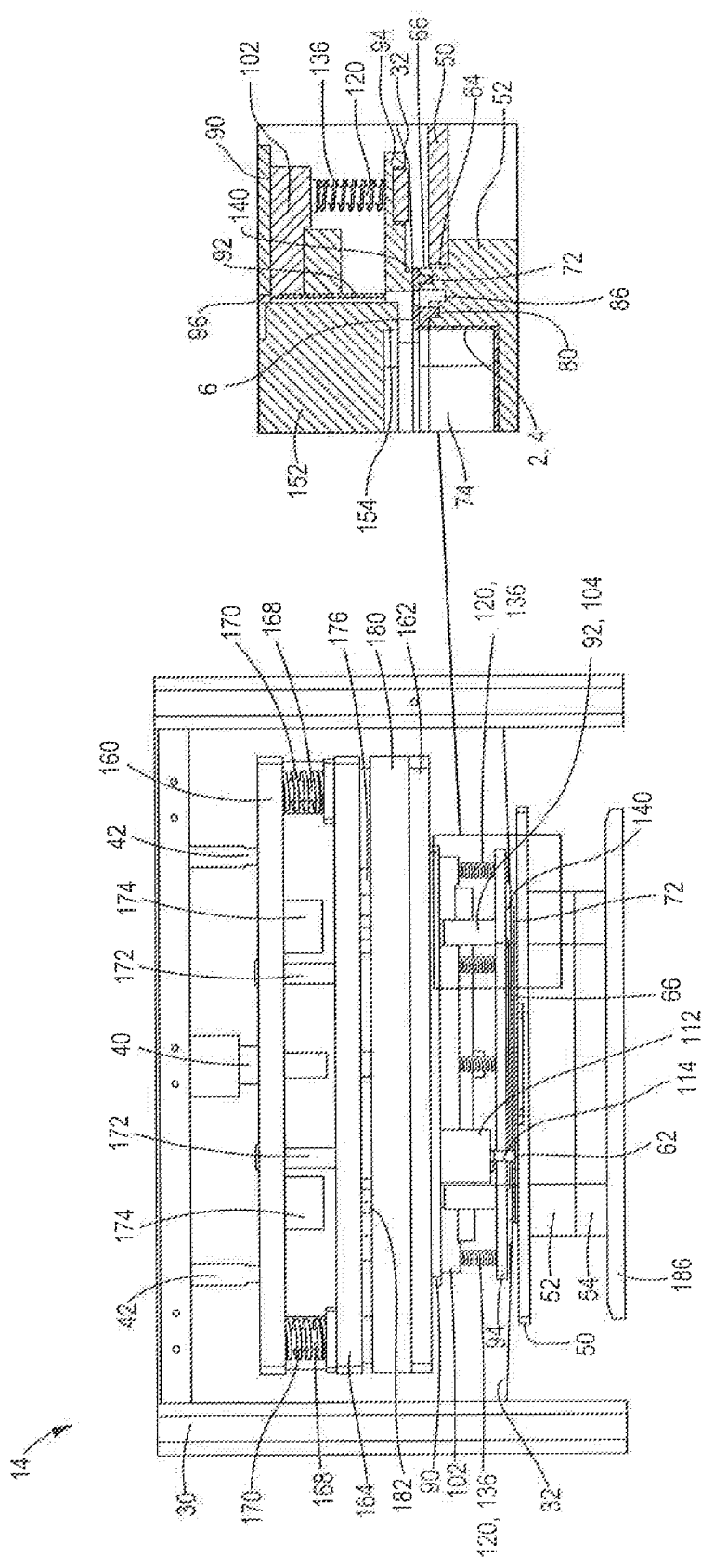

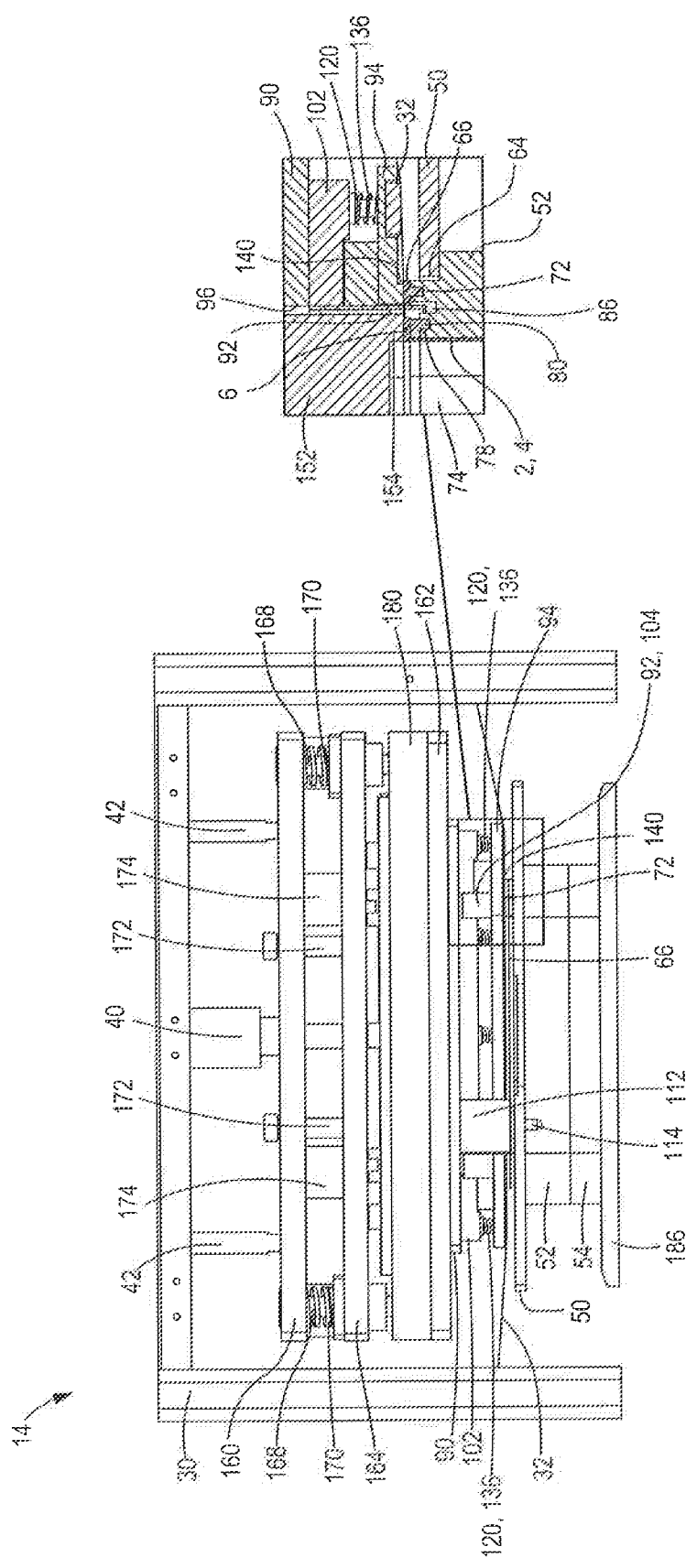

SEAL AND CUT ASSEMBLY FOR HEAT SEALING MACHINE

CROSS-REFERENCE TO RELATED APPLICATIONS

This patent application claims the benefit of U.S. Provisional Application No. 63/111,539 filed Nov. 9, 2020.

TECHNICAL FIELD

The present disclosure relates generally to heat sealing machines for blister packages and, more particularly, to a seal and cut assembly for cutting a backing sheet from a web of backing material and sealing the backing sheet on a blister tray to form a blister package.

BACKGROUND

Blister packages are pre-formed plastic packaging used for retention and display of small consumer goods, foods, pharmaceutical or similar products that are offered to consumers. Blister packages are also used in other applications, such as in the medical industry for sterile storage and transport of medical instruments. As shown in FIG. 1, a primary component of a blister package is a transparent blister tray 2 having blister cavity or pocket 4 for the stored item and a flange or other attachment surface 6 for attachment of a backing sheet 8. The blister tray 2 may be made fabricated from a formable web, usually a thermoformed plastic such as PVC, that is typically transparent. The backing sheet 8 is formed from materials such as paper, paperboard, aluminum foil, plastic or the like that is adhered to the attachment surface 6 of the blister tray 2 by a heat activated adhesive applied as a coating on the attachment surface 6 or the backing sheet 8 to enclose and retain the item within the blister package. In the medical area, for example, the backing sheets 8 may be formed from Tyvek® sheet material that is vapor permeable so that sterilizing fluids can be infused through the backing sheets 8 to sterilize medical instruments enclosed within the blister package. With this arrangement, contents of the blister package can be visually examined through the transparent blister tray 2 without the necessity of opening the blister package.

In current implementations, the backing sheets 8 are precut or preformed from the sheet material to a shape that is complimentary to the shape of the attachment surface 6 of the blister tray 2. In one exemplary fabrication arrangement of a blister package heat sealing machine, a blister tray 2 is placed in a corresponding recess of a nesting tray and a backing sheet 8 is placed on the attachment surface 6. The backing sheet 8 may be aligned with the attachment surface 6 by alignment pins that surround the recess. The nesting tray may be moved under a heat seal block or die that is then lowered to apply heat and pressure to the attachment surface 8 and corresponding portions of the backing sheet 8 to activate the adhesive and seal the blister package. The nesting tray is separated from the heat seal die and the completed blister package is removed so the process can be repeated. This can be a labor-intensive process if the blister tray 2 and backing sheet 8 are manually positioned and removed. Moreover, the speed of movement of the nesting tray and the weight of the backing sheet 8, or lack thereof, can cause the backing sheet 8 to float and misalign with the attachment surface 6 prior to sealing, and possibly result in rejection of the blister package.

The backing sheets 8 typically have printed information on an outer surface regarding product information, regulatory information and warnings, barcodes, and the like, and the printed information is usually required to be in registry with the shape of the backing sheet 8. The pre-processing of the sheet material to the specification required for the individual backing sheets 8 increases the cost of the backing sheets 8 and, correspondingly, the cost of the blister package. The bister package manufacturing facility generally keeps inventory of backing sheets 8 on hand for availability at the time required for production runs. If the facility manufactures different blister packages, it may be necessary to maintain inventories of each type of backing sheet 8 so that the heat-sealing machines may be operated relatively continuously to maximize their value. However, the inventory carrying costs of the backing sheets 8 further increases the cost of the blister packages.

SUMMARY OF THE DISCLOSURE

In one aspect of the present disclosure, a seal and cut tooling assembly for a heat sealing machine for forming blister packages is disclosed. The seal and cut tooling assembly may include a knife stop plate having a heat seal block opening for receiving a heat seal block of a heater assembly of the heat sealing machine therethrough, a clamping plate having a knife opening and a clamping shoulder extending downward from a clamping plate bottom surface and surrounding the knife opening, the clamping plate operatively connected to the knife stop plate to allow movement of the clamping plate toward and away from the knife stop plate, a plurality of knife position springs biasing the clamping plate away from the knife stop plate, and a knife having a complimentary shape to a backing sheet for a blister package that is heat sealed by the heat sealing machine, the knife being mounted to and extending downward from a knife stop plate bottom surface, encircling the heat seal block opening and aligned within the knife opening such that the plurality of knife position springs are compressed and the knife extends through the knife opening to cut the backing sheet from a backing material web after the clamping shoulder engages a clamping gasket shoulder support of a nesting tray assembly of the heat sealing machine.

In another aspect of the present disclosure, a method for heat sealing a blister package is disclosed. The method may include extending a backing material web between a nesting tray assembly and a seal and cut tooling assembly of a heat sealing machine, wherein a blister tray of the blister package is resident within a blister nest of the nesting tray assembly, clamping the backing material web between a clamping gasket support shoulder of the nesting tray assembly and a clamping shoulder of the seal and cut tooling assembly, clamping the backing material web between a sealing gasket support shoulder of the nesting tray assembly and a heat seal shoulder of a heater assembly, wherein the clamping gasket support shoulder and the sealing gasket support shoulder define a knife slicing groove therebetween, and extending a knife of the seal and cut tooling assembly between the clamping gasket support shoulder and the sealing gasket support shoulder and into the knife slicing groove to cut a backing sheet of the blister package from the backing material web.

In a further aspect of the present disclosure, a heat sealing machine for heat sealing a blister package is disclosed. The heat sealing machine may include a nesting tray assembly having a blister nest for receiving a blister tray of the blister package, a sealing gasket support shoulder having a shape that is complimentary to a backing sheet shape of a backing sheet for the blister package, and a clamping gasket support shoulder surrounding the sealing gasket support shoulder so that a knife slicing groove is defined between the sealing gasket support shoulder and the clamping gasket support shoulder, a heater assembly having a heat seal block with a heat seal shoulder extending downward from heat seal block bottom surface, wherein the heater assembly is disposed above the nesting tray assembly, and a seal and cut tooling assembly having a clamping shoulder and a knife having a knife shape that is complimentary to the backing sheet shape, wherein the knife is extendable past the clamping shoulder and is movable relative to the clamping shoulder, wherein the seal and cut tooling assembly is disposed between the nesting tray assembly and the heater assembly. A backing material web may extend between the nesting stray assembly and the seal and cut tooling assembly, and the heat sealing machine may operate to clamp the backing material web between the clamping shoulder and the clamping gasket support shoulder, to clamp the backing material web between the heat seal shoulder and the sealing gasket support shoulder, and to extend the knife between the clamping gasket support shoulder and the sealing gasket support shoulder and into the knife slicing groove to cut the backing sheet from the backing material web.

Additional aspects are defined by the claims of this patent.

BRIEF DESCRIPTION OF THE DRAWINGS

FIG. 3 is a front view of the seal and cut assembly of the blister package heat sealing machine of FIG. 2;

FIG. 4 is a right side view of the seal and cut assembly of the blister package heat sealing machine of FIG. 2;

FIG. 10 is a partially exploded isometric view of a seal and cut tooling assembly, a heater assembly and a heat plate assembly in accordance with the present disclosure of the seal and cut assembly of FIG. 3;

FIG. 11 is a top assembly view of the seal and cut tooling assembly, the heater assembly and the heat plate assembly of FIG. 10;

FIG. 12 is a rear assembly view of the seal and cut tooling assembly, the heater assembly and the heat plate assembly of FIG. 10;

FIG. 13 is a right side assembly view of the seal and cut tooling assembly, the heater assembly and the heat plate assembly of FIG. 10;

FIG. 18 is a front view of the seal and cut assembly of FIGS. 3 and 4 in a retracted position;

FIG. 18A is an enlarged partial cross-sectional view of the seal and cut assembly of FIG. 18;

FIG. 19 is a front view of the seal and cut assembly of FIGS. 3 and 4 in a web clamping position;

FIG. 19A is an enlarged partial cross-sectional view of the seal and cut assembly of FIG. 19;

FIG. 21 is a front view of the seal and cut assembly of FIGS. 3 and 4 in a cutting position; and FIG. 21A is an enlarged partial cross-sectional view of the seal and cut assembly of FIG. 21.

DETAILED DESCRIPTION

Figure 2:
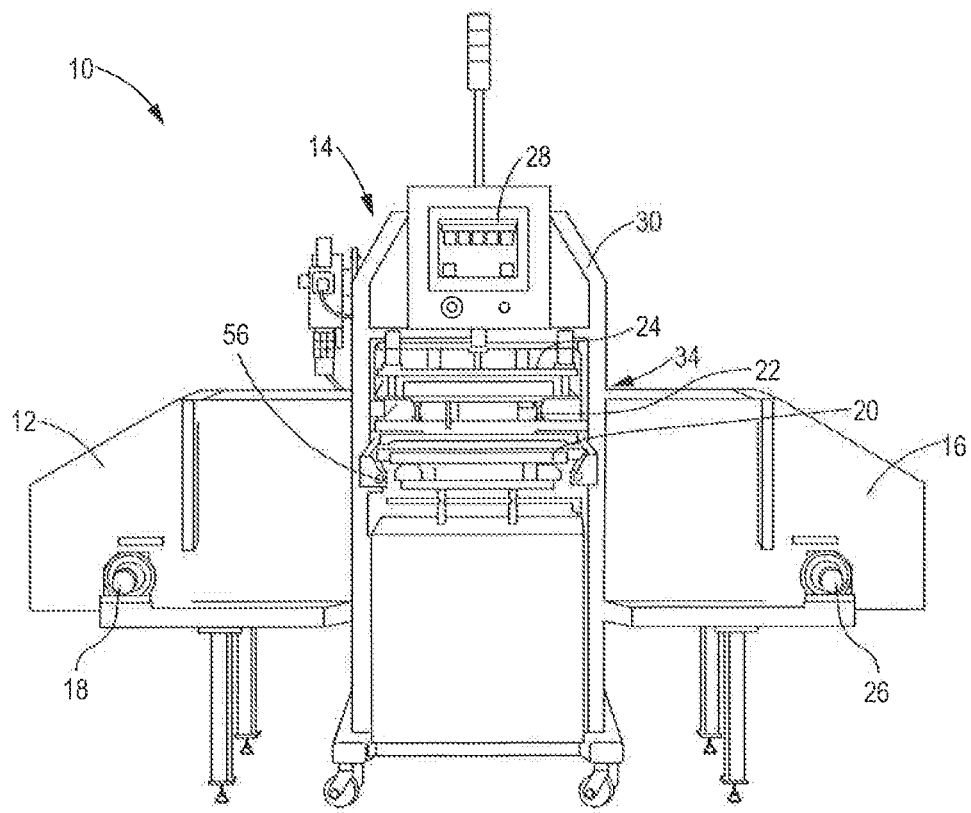
FIG. 2 is a front elevational view of a blister package heat sealing machine in which a seal and cut assembly in accordance with the present disclosure may be implemented.

FIG. 2 illustrates a blister package heat sealing machine 10 that may be used to assemble blister packages of the type described above where the backing sheets 8 are formed from a web of backing material as the blister packages are being sealed as opposed to the backing sheets 8 being prefabricated in bulk and individually matched up to a corresponding blister tray 2 prior to sealing. The heat sealing machine 10 may include a web feed assembly 12, a seal and cut assembly 14 and a web take-up assembly 16. The web feed assembly 12 may include a feed roll 18 that may have a web of backing material rolled up thereon and be actuatable to feed the backing material web to and through the seal and cut assembly 14. The web feed assembly 12 may implement known material handling processes to deliver the backing material web from the feed roll 18 to the seal and cut assembly 14. An incremental amount of the backing material web is fed through the seal and cut assembly 14 to a position between a nesting tray assembly 20 and a seal and cut tooling assembly 22 so that a portion of the backing material web aligned with the blister trays 2 can be sealed via heat provided by a heater assembly 24 and cut into backing sheets 8 in a manner illustrated and described more fully below. After the backing sheets 8 are cut from the backing material web, the backing material web is advanced incrementally to the next alignment position while the scrap portion of the backing material web is rolled up on a take-up roll 26 of the web take-up assembly 16. The advancement of the backing material web may be indexed so that it advances a predetermined distance during each seal and cutting cycle. In alternative embodiments, the backing material web may have index marks at the predetermined advancement interval, and the heat sealing machine 10 may have an appropriate scanner for sensing the index marks and causing the heat sealing machine 10 to stop advancement of the backing material web at the appropriate position. The heat-sealing process may be controlled by selections for temperature, pressure, speed and the like entered at a control panel 28.

FIGS. 3 and 4 illustrate the seal and cut assembly 14 in greater detail. The components of the seal and cut assembly 14 are supported by a frame 30 that is open at the sides so that a backing material web 32 to be fed between the nesting tray assembly 20 and the seal and cut tooling assembly 22. The seal and cut tooling assembly 22 and a heat plate assembly 34 are suspended from the heater assembly 24. A cylinder 36 is supported from the frame 30 by a fixed cylinder mount plate 38, and the heater assembly 24 is suspended from the cylinder 36 by a piston rod 40. Guide rods 42 disposed on either side of the cylinder 36 extend though the cylinder mount plate 38 to the heater assembly 24 to assist in guiding movement of the assemblies 22, 24, 34 as the piston rod 40 is extended and retracted.

Figure 5:
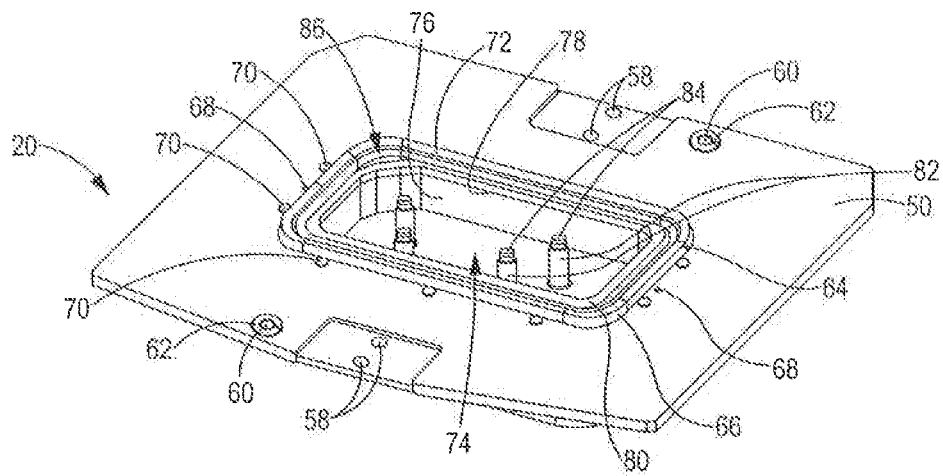
FIG. 5 is an isometric view of nesting tray assembly in accordance with the present disclosure of the blister package heat sealing machine of FIG. 2.
Figure 6:
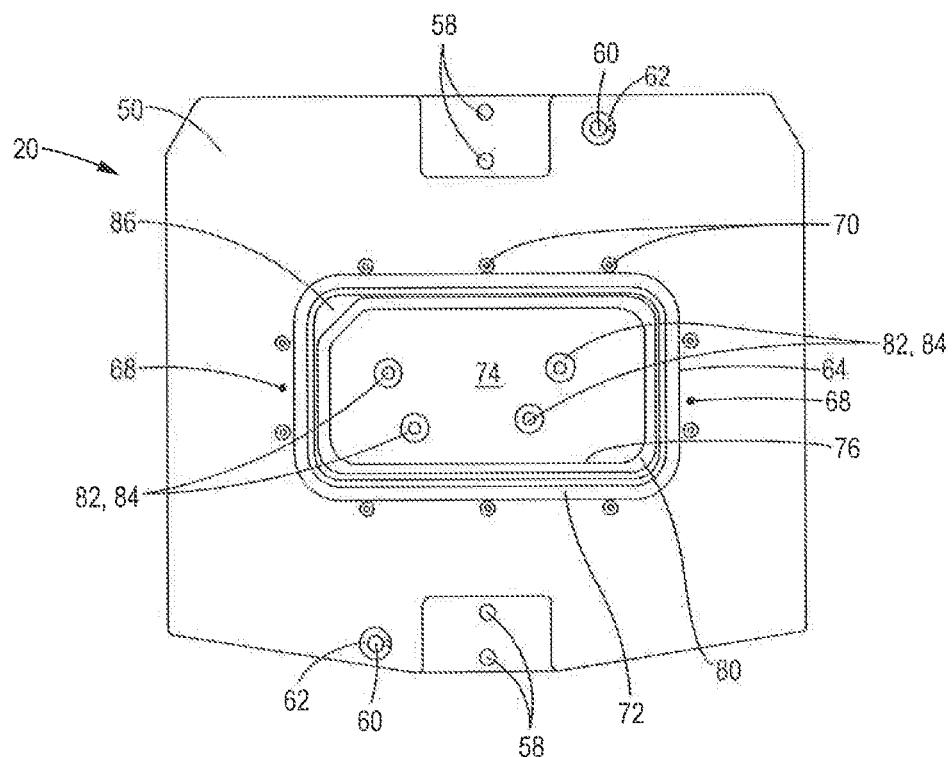
FIG. 6 is a top view of the nesting tray assembly of FIG. 5.
Figure 7:
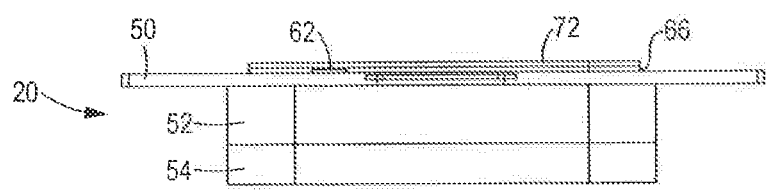
FIG. 7 is a side view of the nesting tray assembly of FIG. 5.

The nesting tray assembly 20 is illustrated in greater detail in FIGS. 5-7. As shown, the nesting tray assembly 20 has a 1-up configuration so that one blister package may be sealed during each execution of the seal and cut process by the heat sealing machine 10. In alternative embodiments, the nesting tray assembly 20 can be configured to receive multiple blister trays 2. In the illustrated embodiment, the nesting tray assembly 20 includes a nesting tray top plate 50, a nesting tray seal block 52 and a nesting tray support plate 54. The nesting tray top plate 50 is configured to be received by a slidable feed tray 56 (FIG. 2) and secured thereto by cotter pins or other temporary or permanent fastening mechanisms (not shown) that may be inserted through fastener openings 58 through the nesting tray top plate 50. To compensate for movement of the nesting tray assembly 20 relative to the feed tray 56 and the assemblies 22, 24, 34, the nesting tray top plate 50 may have one or more alignment openings 60 there through that are surrounded by alignment bushings 62 that are engaged to align the nesting tray assembly 20 as discussed further below.

The nesting tray top plate 50 also has a seal block opening 64 defined there through and shaped to receive a clamping gasket support shoulder 66 of the nesting tray seal block 52. The clamping gasket support shoulder 66 is inserted upward through the seal block opening 64 until a top surface of the nesting tray seal block 52 engages a bottom surface of the nesting tray top plate 50. When fully inserted, the clamping gasket support shoulder 66 may extend upward above the top surface of the nesting tray top plate 50. Dowels 68 may be inserted through corresponding holes in the nesting tray top plate 50 and the nesting tray seal block 52 to align the clamping gasket support shoulder 66 within the seal block opening 64, and screws 70 may rigidly attach the nesting tray seal block 52 to the nesting tray top plate 50. A web clamping gasket 72 is attached to a top surface of the clamping gasket support shoulder 66 and will function to engage the backing material web 32 during the cutting step as illustrated and described further below. The nesting tray support plate 54 may be attached to a bottom surface of the nesting tray seal block 52 to support the nesting tray assembly 20 and space the nesting tray assembly 20 relative to the seal and cut tooling assembly 22.

The nesting tray seal block 52 has a recess or cavity therein defining a blister nest 74 configured to receive a blister tray 2. The blister nest 74 has an inner surface with a complimentary shape to the blister tray 2 to be received therein. The blister nest 74 has a side wall 76 extending upward and surrounding the blister nest 74. The side wall 76 terminates at an upper end at a sealing gasket support shoulder 78 having a flange sealing gasket 80 is attached thereto. The sealing gasket support shoulder 78 and the flange sealing gasket 80 may have complimentary shapes to the attachment surface 6 of the blister tray 2, and the attachment surface 6 will sit on top of the flange sealing gasket 80 when the blister tray 2 is disposed within the blister nest 74. The flange sealing gasket 80 will support the attachment surface 6 when pressure and heat are applied during the sealing step as illustrated and described further below. Additional attachment surfaces 6 within the interior of the blister tray 2 may require support during the sealing step. In such blister packages, the blister nest 74 may include one or more blister support posts 82 extending upward at appropriate locations. The blister support posts 82 may have island sealing gaskets 84 attached at upper ends and positioned to engage the corresponding attachment surfaces 6 of the blister tray 2 to support the attachment surfaces 6 during the sealing step. The gaskets 72, 80, 84 may be fabricated from resilient materials such as rubber, silicone and the like that may facilitate attachment to the support shoulders 66, 78 and blister support posts 82 and flexible resistance during the clamping, sealing and cutting steps described below.

Figure 8:
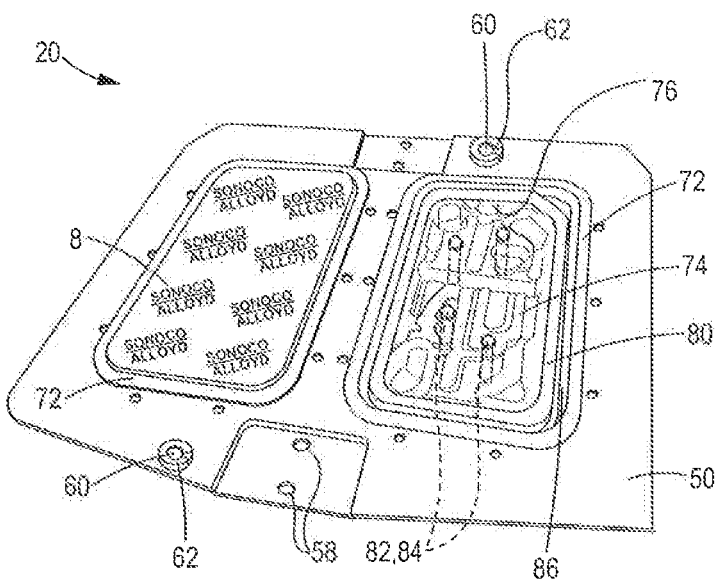
FIG. 8 is an isometric view of an alternative embodiment of a nesting tray assembly in accordance with the present disclosure.
Figure 9:
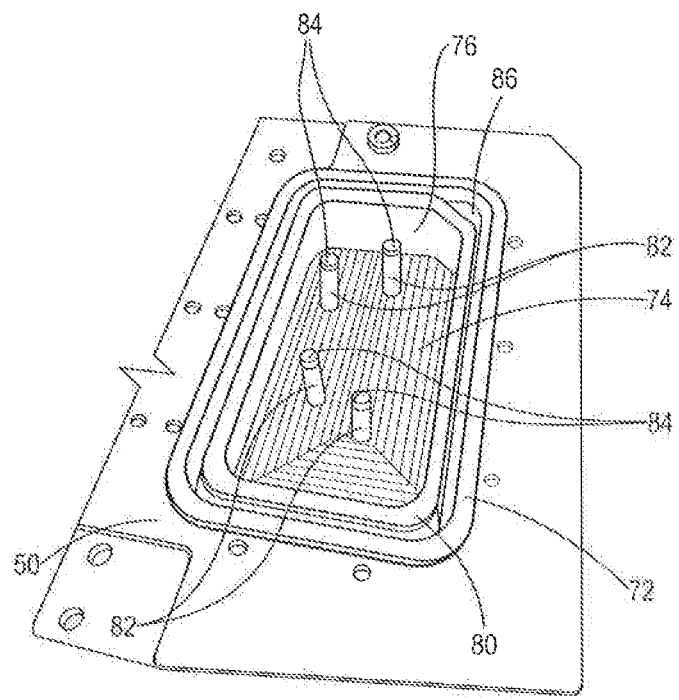
FIG. 9 is a partially enlarged view of the nesting tray assembly of FIG. 8.

As shown in FIGS. 5 and 6, the web clamping gasket 72 and the flange sealing gasket 80 are generally shaped to correspond to the attachment surfaces 6 of the blister tray 2. The flange sealing gasket 80 is smaller than and disposed inward of the web clamping gasket 72. A knife slicing groove 86 is defined between the support shoulders 66, 78 and the gaskets 72, 84 for receipt of a cutting implement therein during the cutting step as illustrated and described further below. The knife slicing groove 86 is further shown in FIGS. 8 and 9 that depict an embodiment of the nesting tray assembly 20 having blister nests 74 for two blister trays 2. FIGS. 8 and 9 further illustrate that the backing sheet 8 of the blister package has an outer edge that is disposed inward of an inner edge of the web clamping gasket 72.

FIGS. 10-13 illustrate the arrangement and structure of the seal and cut tooling assembly 22, the heater assembly 24 and the heat plate assembly 34 in greater detail. The heat plate assembly 34 is positioned between the seal and cut tooling assembly 22 and the heater assembly 24 and is mounted to the heater assembly 24 for heat transfer. This arrangement facilitates coordinated movement of the assemblies 22, 24, 34 to sequentially execute clamping, sealing and cutting steps to form the blister package as illustrated and discussed below.

Figure 14:
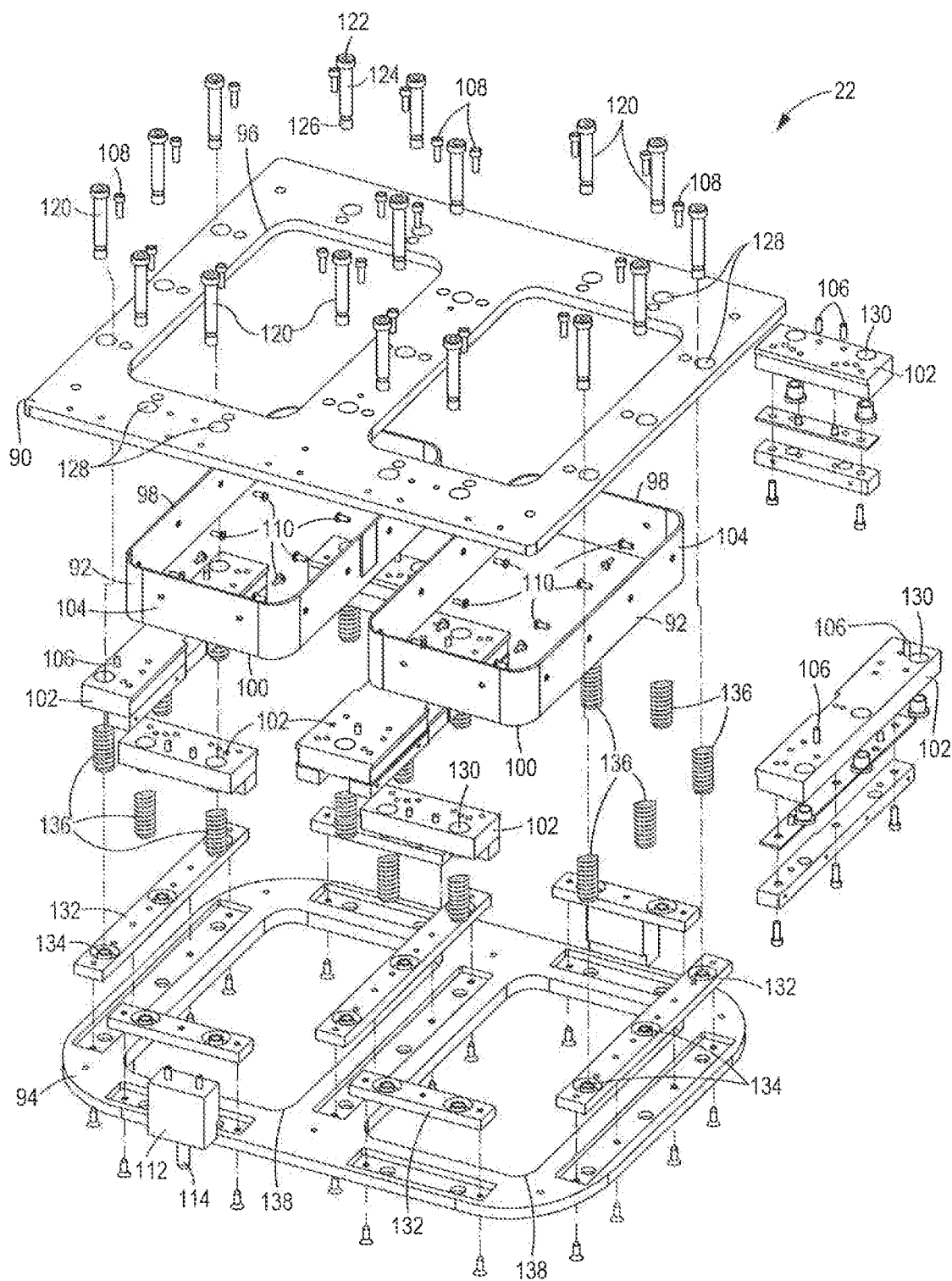
FIG. 14 is an exploded isometric view of the seal and cut tooling assembly of FIG. 10.

The components of the seal and cut tooling assembly 22 are illustrated in greater detail in the exploded view of FIG. 14 where the illustrated seal and cut tooling assembly 22 corresponds to the two-up blister tray implementation of the nesting tray assembly 20 of FIGS. 8 and 9. The seal and cut tooling assembly 22 includes a knife stop plate 90, knives 92 and a clamping plate 94. The knife stop plate 90 is a flat plate having a pair of heat seal block openings 96 defined there through that are shaped to receive heating elements of the heat plate assembly 34. The knives 92 may be fabricated from rolled steel or other appropriate material and shaped to correspond to the shape of the backing sheet 8. The knives 92 are mounted beneath the knife stop plate 90 with knife top edges 98 abutting a bottom surface of the knife stop plate 90. Knife bottom edges 100 of the knives 92 are shaped as necessary to cut through the backing material used in fabricating a particular blister package. In some embodiments, the knife bottom edge 100 may be serrated and have a plurality of teeth (not shown) defined therein that can pierce the backing material web 32 with a sufficiently clean and consistent cut. For example, a knife 92 having 16 teeth per inch (TPI) in the knife bottom edge 100 may provide a clean cut when the backing material is Tyvek® sheet material having a thickness with in a range from approximately 6.0 mils (0.0060") to approximately 7.5 mils (0.0075"). In other applications, providing teeth at a greater or lesser TPI may be necessary to cleanly cut the backing material web 32.

The knives 92 may be mounted to the bottom surface of the knife stop plate 90 by a plurality of knife mounting blocks 102 positioned around knife outer surfaces 104. The knife mounting blocks 102 may be aligned by mounting block dowels 106 and anchored to the bottom surface of the knife stop plate 90 by mounting block screws 108. The knives 92 are secured in abutment with the bottom surface of the knife stop plate 90 by knife screws 110 screwed into the knife mounting blocks 102. To ensure that the nesting tray assembly 20 is aligned with the seal and cut tooling assembly 22 to seal the blister package, the seal and cut tooling assembly 22 may include at least one, and in most implementations two or more, alignment pin blocks 112 with alignment pins 114 extending downward therefrom. The alignment pin blocks 112 are mounted to the bottom surface of the knife stop plate 90 proximate an outer edge of the knife stop plate 90 and with the alignment pins 114 extending downward toward the nesting tray assembly 20. The alignment pins 114 may be tapered, and may be positioned such that, within an expected range of displacement of the nesting tray top plate 50 relative to the feed tray 56, the alignment pins 114 will be engaged by the alignment bushings 62 and directed into the alignment openings 60 to force the feed tray 56 into position under the seal and cut tooling assembly 22.

The clamping plate 94 is suspended below the knife stop plate 90 and the knives 92 by a plurality of knife guide bolts 120. Each knife guide bolt 120 may have a bolt head 122, a cylindrical bolt body 124 and a threaded bolt shank 126. The bolt bodies 124 and the bolt shanks 126 may be inserted through bolt openings 128 in the knife stop plate 90 and aligned mounting block openings 130 in the knife mounting blocks 102. The bolt heads 122 may also pass through the bolt openings 128, and the mounting block openings 130 may be counterbored so the bolt heads 122 pass partially through until being engaged by shoulders of the counterbores. With the bolt bodies 124 and the bolt shanks 126 extending below the knife mounting blocks 102, the knife guide bolts 120 may be operatively coupled to the clamping plate 94 by spring dock blocks 132 that are mounted to a top surface of the clamping plate 94. The bolt shanks 126 may be screwed into openings within corresponding spring recesses 134 of the spring dock blocks 132.

Knife position springs 136 are disposed about the bolt bodies 124 with lower ends of the knife position springs 136 being received within the corresponding spring recesses 134. The knife position springs 136 are preloaded so that upper ends of the knife position springs 136 engage bottom surfaces of the knife mounting blocks 102 to bias the knife stop plate 90 and the knives 92 upward away from the clamping plate 94 toward a maximum upward position where the bolt heads 122 are engaged by the counterbore shoulders of the mounting block openings 130. The knife stop plate 90 and the knives 92 will move downward toward the clamping plate 94 when sufficient downward force is applied to the knife stop plate 90 to overcome the forces of the knife position springs 136.

Figure 15:
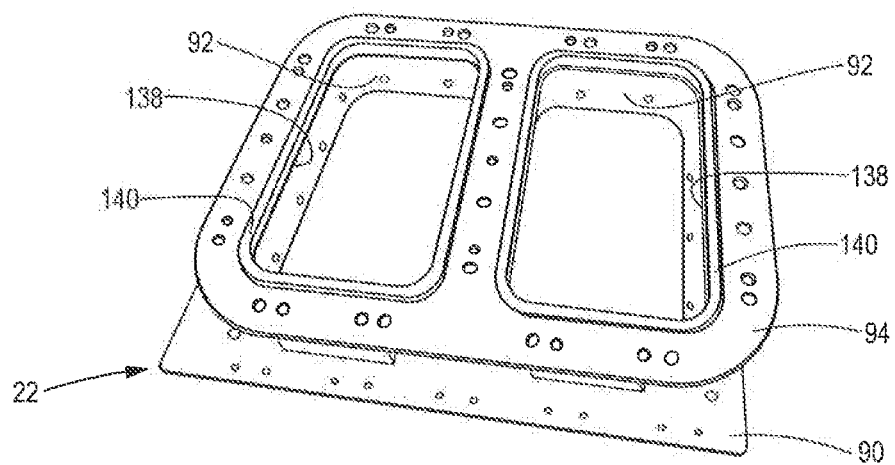
FIG. 15 is a bottom view of the seal and cut tooling assembly of FIG. 10.

To allow the knives 92 to move downward past the clamping plate 94 to the nesting tray top plate 50, the backing material web 32 and the blister tray 2, the clamping plate 94 has a knife opening 138 aligned with each knife 92. Each knife opening 138 has a complimentary shape to the knife 92 and to the backing sheet 8. The knife opening 138 is larger than the flange sealing gasket 80 and the knife 92, and is approximately the same size as an inner edge of the web clamping gasket 72. As shown in the rear view of FIG. 12, the side view of FIG. 13 and the bottom view of FIG. 15 of the seal and cut tooling assembly 22, the clamping plate 94 has a clamping shoulder 140 extending downward from the bottom surface of the clamping plate 94 around the knife opening 138. The clamping shoulder 140 is sized and positioned to align with the web clamping gasket 72 when the alignment pins 114 are disposed within the alignment openings 60.

Figure 16:
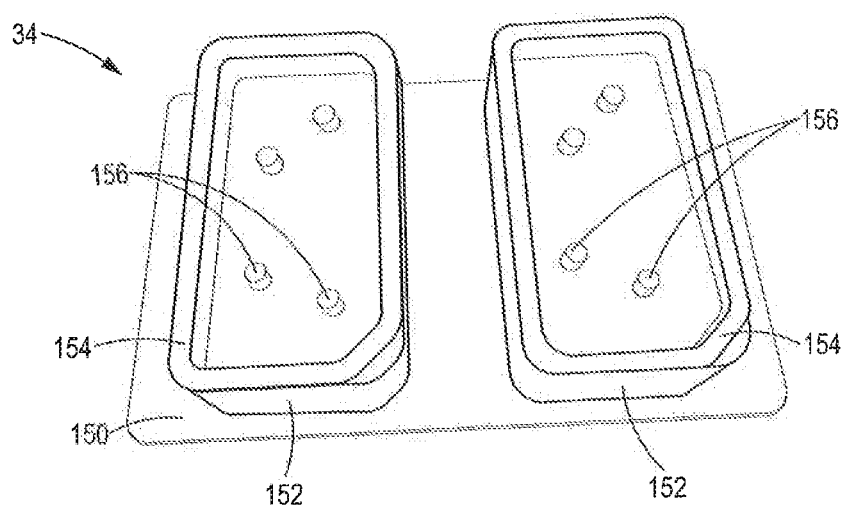
FIG. 16 is a bottom view of the heat plate assembly of FIG. 10.

Referring back to FIGS. 10-13, the heat plate assembly 34 includes a heat plate 150 with one or more heat seal blocks 152 (FIG. 16; blocked by knife 92 in FIGS. 10-13) mounted to and extending downward from a bottom surface of the heat plate 150. The heat seal blocks 152 may be sized and shaped to correspond to the shape of the attachment surfaces 6 of the blister trays 2, and the knives 92 and the heat seal block openings 96 are sized for the heat seal blocks 152 to be inserted there through. As shown in the bottom view of FIG. 16, each heat seal block 152 has a downwardly extending heat seal shoulder 154 that is shaped to correspond to the shape of the attachment surface 6 of the blister tray 2 and, correspondingly, to the shape of the flange sealing gasket 80. Each heat seal block 152 may have additional heat seal islands 156 that will align with the island sealing gaskets 84 to seal any additional attachment surfaces 6 of the blister tray 2. Returning to FIG. 10, locking pins 158 may be mounted on a top surface of the heat plate 150 for attaching the heat plate assembly 34 to the heater assembly 24 as discussed further below.

The configuration of the heater assembly 24 is best illustrated in FIGS. 10-13. The heater assembly 24 includes an upper support plate 160, a lower support plate 162, a moving plate 164 and a heat platen 166 mounted to a bottom surface of the moving plate 164. The upper support plate 160 and the lower support plate 162 are connected to each other by a plurality of drive rods 168 extending therebetween and disposed about the perimeter of the support plates 160, 162. The drive rods 168 are rigidly connected to prevent relative movement between the support plates 160, 162. The moving plate 164 is disposed between the support plates 160, 162 with the drive rods 168 passing through the moving plate 164. The moving plate 164 is free to slide up and down along the drive rods 168 and move relative to the support plates 160, 162. Moving plate float springs 170 are disposed around the drive rods 168 and between the upper support plate 160 and the moving plate 164. The moving plate float springs 170 are preloaded to bias the moving plate 164 toward the lower support plate 162. Downward movement of the moving plate 164 may be limited by moving plate spacer screws 172 extending between the plates 160, 164. The moving plate spacer screws 172 may extend through counterbored openings in the upper support plate 160 and be screwed into the moving plate 164. As the moving plate float springs 170 bias the moving plate 164 downward, heads of the moving plate spacer screws 172 engage counterbore shoulders in the openings to limit the downward movement. The moving plate 164 will move upward toward the upper support plate 160 as the moving plate spacer screws 172 slide within the openings when sufficient upward force is applied to compress the moving plate float springs 170. Movement of the moving plate 164 toward the upper support plate 160 may be limited by one or more stop blocks 174 mounted to the bottom surface of the upper support plate 160. The stop blocks 174 may also have utility in ensuring a uniform seal of the backing sheet 8 to the attachment surfaces 6 as discussed below.

The heat platen 166 is operatively connected to a bottom surface of the moving plate 164, and may be spaced therefrom by platen spacers 176 to accurately position the heat platen 166. As illustrated, the lower support plate 162 has a platen opening 178 there through that is sized to allow the heat platen 166 to pass through the lower support plate 162 as the heat platen 166 moves up and down with the moving plate 164. The lower support plate 162 may have one or more stiffener bars 180 mounted thereto to provide structural reinforcement in compensation for the material removed to form the platen opening 178. The heat plate assembly 34 is mounted to a bottom surface of the heat platen 166 by inserting the locking pins 158 through pin openings (not shown) through the heat platen 166. Portions of the locking pins 158 extending above a top surface of the heat platen 166 are engaged by mounting clips 182 to lock the heat plate assembly 34 to the heat platen 166 so that the heat plate assembly 34, the moving plate 164 and the heat platen 166 move together. A conduit fitting 184 extending from the heat platen 166 allows for making connections to the heat platen 166 to generate heat that will be transferred to the heat plate 150 and the heat seal block(s) 152. With the heat plate assembly 34 in place, the knife stop plate 90 is mounted to a bottom surface of the lower support plate 162 with the heat seal block(s) 152 partially extend through the corresponding heat seal block opening(s) 96 and knives 92.

Returning to FIGS. 3 and 4, the combined assemblies 22, 24, 34 are mounted within the frame 30 below the cylinder mount plate 38. The piston rod 40 and the guide rods 42 are attached to the upper support plate 160. With this arrangement, the cylinder 36 controls the downward and upward movement of the assemblies 22, 24, 34 to attach backing sheets 8 to blister trays 2. The nesting tray assembly 20 is supported by an anvil pad 186 of an anvil 188 that is mounted to the frame 30 by anvil support posts 190. The nesting tray assembly 20 may be affixed to the anvil pad 186 and held stationary relative to the frame 30 in some implementations. In alternative implementations such as that depicted in FIG. 2, the nesting tray assembly 20 may be mounted on the feed tray 56 as shown in FIG. 2 or other material handling devices that alternately slide out from under the assemblies 22, 24, 34 to remove completed blister packages and insert blister trays 2 into the blister nests 74, and slide under the assemblies 22, 24, 34 to place the nesting tray assembly 20 on the anvil pad 186 in preparation for sealing blister packages.

INDUSTRIAL APPLICABILITY

Figure 1:
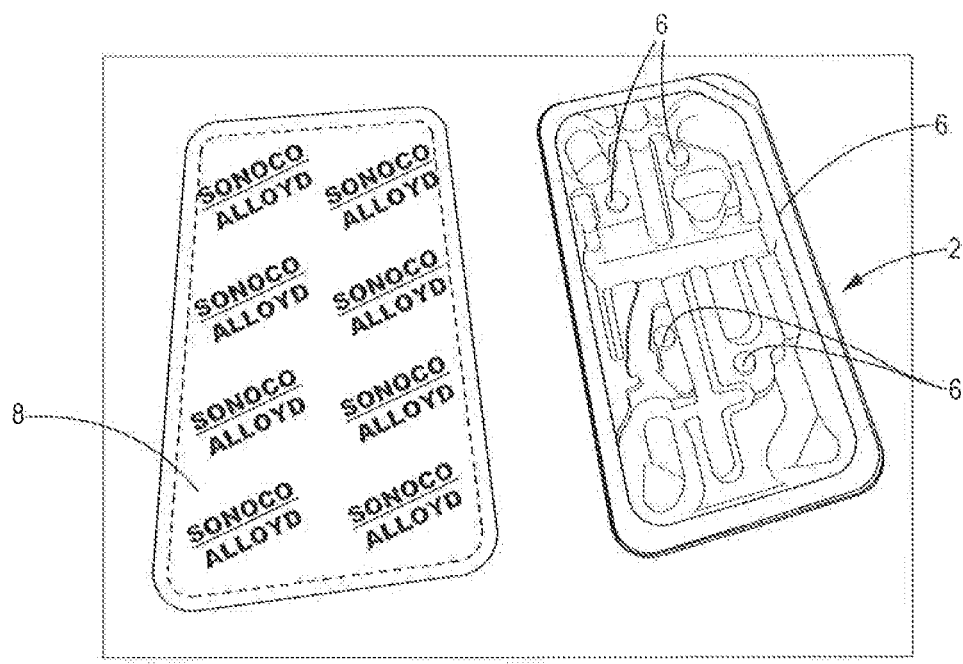
FIG. 1 is an isometric view of a blister tray and a backing sheet of an exemplary blister package.
Figure 17:
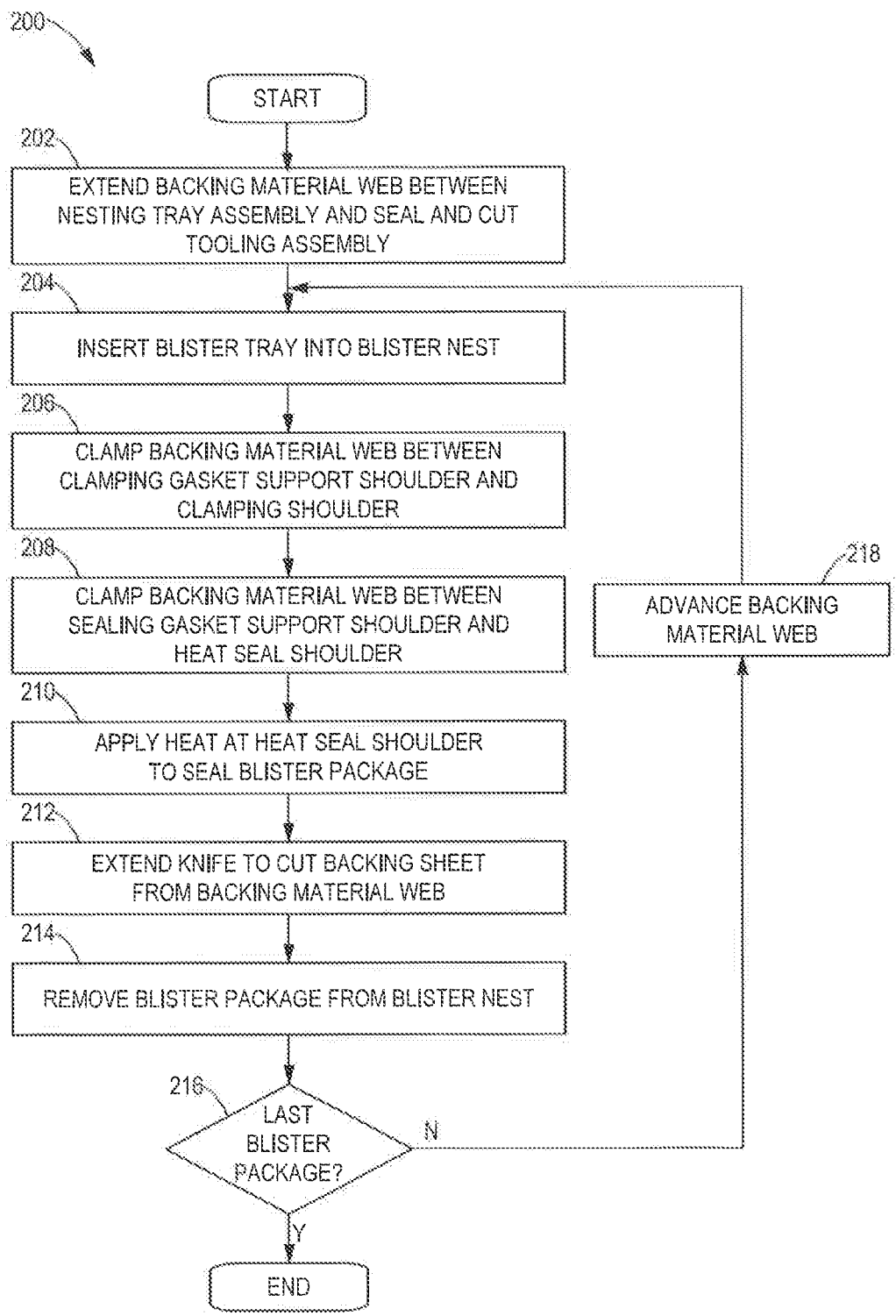
FIG. 17 is a flow diagram of an exemplary blister package heat sealing routine in accordance with the present disclosure.

An exemplary blister package heat sealing routine 200 in accordance with the present disclosure implemented in the heat sealing machine 10 is illustrated in FIG. 17, and the operation of the seal and cut assembly 14 of the heat sealing machine 10 to seal blister packages and cut out the backing sheets 8 from the backing material web 32 is illustrated in the sequence from FIGS. 18, 18A through FIGS. 21, 21A. The routine 200 may begin a block 202 by extending the backing material web 32 through the seal and cut assembly 14 between the nesting tray assembly 20 and the seal and cut tooling assembly 22. A free end of the backing material web 32 may be extended from the feed roll 18, passed through the seal and cut assembly 14, and attached to the take-up roll 26. After the backing material web 32 is extended, the routine 200 may advance to a block 204 where a blister tray 2 is inserted into the blister nest 74 of the nesting tray assembly 20. Where the nesting tray assembly 20 is configured with multiple blister nests 74, blister trays 2 may be inserted into each of the blister nests 74. When the blister trays 2 are inserted, the attachment surfaces 6 will rest on the sealing gaskets 80, 84 without extending across the knife slicing grooves 86 to the web clamping gaskets 72. With the blister trays 2 in place, the feed tray 56 of the embodiment of FIG. 1 may be pushed into the seal and cut assembly 14 to align the nesting tray assembly 20 beneath the seal and cut tooling assembly 22.

Referring to FIGS. 18 and 18A, the seal and cut assembly 14 is illustrated in a fully retracted position and with a blister tray 2 inserted into the blister nest 74. The piston rod 40 is fully retracted by the cylinder 36 and the upper support plate 160 is at its maximum upward position. The moving plate float springs 170 bias the moving plate 164 to its maximum distance from the upper support plate 160 with the heads of the moving plate spacer screws 172 engaged by the counterbored shoulders of the upper support plate 160. At the same time, the knife position springs 136 bias the clamping plate 94 to its maximum distance from the knife stop plate 90 with the bolt heads 122 of the knife guide bolts 120 engaged by the counterbored shoulders of the mounting block openings 130. The backing material web 32 floats between the nesting tray assembly 20 and the seal and cut tooling assembly 22, and a blister tray 2 is resident in the blister nest 74.

As illustrated in the enlarged cross-sectional view of FIG. 18A of a portion of the seal and cut assembly 14, the blister tray 2 is disposed in the blister nest 74 with the attachment surfaces 6 resting on the top surfaces of the flange sealing gasket 80 and the island sealing gaskets 84. The top surfaces of the support shoulders 66, 78 may be configured with attachment channels 192, 194, respectively, that are configured to receive corresponding portions of the gaskets 72, 80 for retentive engagement of the gaskets 72, 80 in the illustrated positions. The heat seal shoulder 154 of the heat seal block 152 is positioned above the flange sealing gasket 80, and the clamping shoulder 140 of the clamping plate 94 is positioned above the web clamping gasket 72. The knife 92 is positioned between the clamping shoulder 140 and the heat seal shoulder 154, and above the knife slicing groove 86 in preparation for cutting a backing sheet 8 from the backing material web 32.

Returning to FIG. 17, the routine 200 may advance to a block 206 where the seal and cut assembly 14 is actuated to clamp the backing material web 32 between the web clamping gasket 72 of the nesting tray assembly 20 and the clamping shoulder 140 of the seal and cut tooling assembly 22. FIGS. 19 and 19A illustrate the seal and cut assembly 14 in a web clamping position during the clamping step at block 206. Referring to FIG. 19, the cylinder 36 has operated to extend the piston rod 40 and the guide rods 42 and move the assemblies 22, 24, 34 downward toward the nesting tray assembly 20. The alignment pins 114 are received by the alignment bushings 62 and the alignment openings 60 to align the nesting tray assembly 20 with the seal and cut tooling assembly 22. Eventually, the clamping shoulder 140 of the clamping plate 94 contacts the backing material web 32 and continues downward to clamp the backing material web 32 between the clamping shoulder 140 and the web clamping gasket 72 as shown in the enlarged view of FIG. 19A. In this position, the backing material web 32 is clamped outward of the knife slicing groove 86. At the point of initial clamping of the backing material web 32, the clamping plate 94, the knife 92 and the heat seal block 152 are in the same relative positions shown in FIGS. 18 and 18A. However, after initial compression of the web clamping gasket 72, the clamping plate 94 is at a maximum downward position and continued extension of the piston rod 40 begins to compress the knife position springs 136 so that the knife 92 and the heat seal block 152 move downward relative to the clamping plate 94.

Figures 20, 20A:
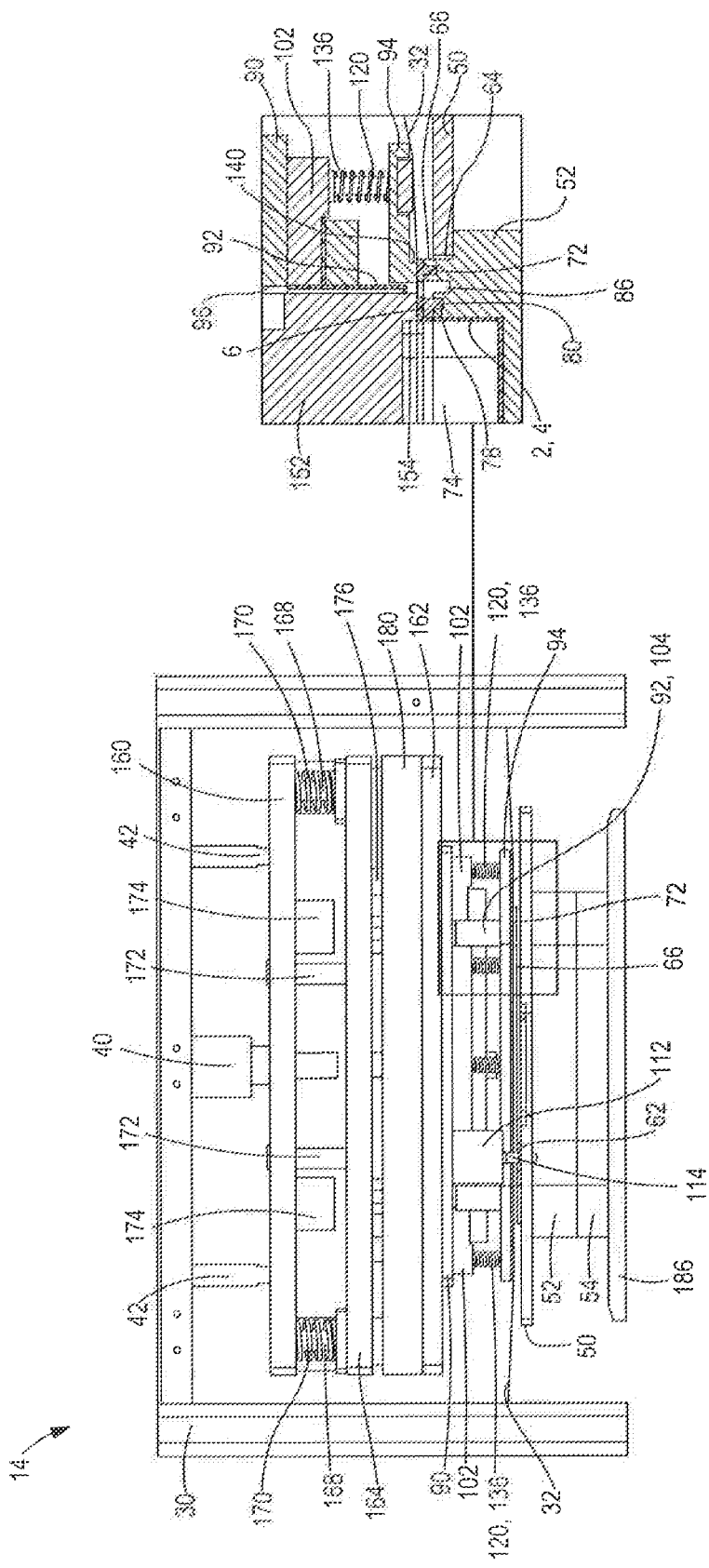
FIG. 20 is a front view of the seal and cut assembly of FIGS. 3 and 4 in a sealing position.
FIG. 20A is an enlarged partial cross-sectional view of the seal and cut assembly of FIG. 20.

After clamping the backing material web 32 at the block 206, the routine 200 of FIG. 17 may advance to a block 208 where the seal and cut assembly 14 is further actuated and advanced to clamp the backing material web 32 between the flange sealing gasket 80 of the nesting tray assembly 20 and the heat seal shoulder 154 of the heat seal block 152. Execution of the second clamping step at block 208 is illustrated in FIGS. 20 and 20A. As the piston rod 40 continues to extend, the knife position springs 136 continue to compress as the knife stop plate 90, the knife 92 and the assemblies 24, 34 move downward relative to the nesting tray assembly 20 and the clamping plate 94. As shown in FIG. 20A, the heat seal shoulder 154 of the heat seal block 152 engages the backing material web 32, and the backing material web 32 and the attachment surfaces 6 are compressed between the heat seal shoulder 154 and the sealing gaskets 80, 84. The knife 92 is still disposed above the backing material web 32 and the knife slicing groove 86. After the backing material web 32 is clamped at the block 208, the routine 200 advances to a block 210 where the heat seal block 152 applies heat at the heat seal shoulder 154 to seal the blister package. The sealing process begins as the heat and pressure from the heat seal block 152 activate the heat and/or pressure sensitive adhesive that has been applied to the backing material web 32, the attachment surfaces 6, or both. After initial compression of the sealing gaskets 80, 84, the heat plate assembly 34 is at a maximum downward position, and continued extension of the piston rod 40 continues to compress the knife position springs 136 so that the knife 92 moves downward relative to the clamping plate 94 and the heat seal block 152 and begins to compress the moving plate float springs 170 so that the support plates 160, 162 move downward relative to the moving plate 164, the heat platen 166 and the heat plate assembly 34. In typical applications, the heat seal block 152 is preheated and the temperature is maintained during a production run producing a series of blister packages such that the clamping of the block 208 and the heat application of the block 210 occur at substantially the same time. However, it is possible in other applications to heat the heat seal block 152 and seal the blister package at the block 210 after performing the clamping at the block 208.

Following clamping at the block 208 and applying heat to seal the blister package at the block 210, the routine 200 may advance to a block 212 where the knife 92 is extended to cut the backing sheet 8 for the blister package from the backing material web 32. The cutting step occurs during the transition between the onset of the sealing step illustrated in FIGS. 20 and 20A and a maximum downward position shown in FIGS. 21 and 21A. Further extension of the piston rod 40 forces the support plates 160, 162, the knife stop plate 90 and the knife 92 downward against the forces of the springs 136, 170 until the stop blocks 174 engage the top surface of the moving plate 164. At this position, maximum pressure is being applied to compress the backing material web 32 and the attachment surfaces 6 between the sealing gaskets 80, 84 and the heat seal shoulder 154. The engagement of the stop blocks 174 with the moving plate 164 assists in distributing the pressure evenly across the sealing gaskets 80, 84 to compensate for any variations in the spring forces of the moving plate float springs 170, and to form a consistent seal between the backing material web 32 and the attachment surfaces 6. As the support plates 160, 162 and the knife stop plate 90 move downward, the knife 92 is driven into the knife slicing groove 86 and through the backing material web 32 to cut through and separate the backing sheet 8 from the backing material web 32 as shown in FIG. 21A. The distance of downward movement of the knife 92 relative to the heat seal block 152 is equal to the initial distance between the stop blocks 174 and the moving plate 164 when the seal and cut assembly 14 is in the fully retracted position. The seal and cut assembly 14 may remain in this position until a prescribed sealing time elapses to ensure the backing sheet 8 is adhered to the attachment surfaces 6 of the blister tray 2.

After sealing of the blister package is complete, the cylinder 36 may retract the piston rod 40 to move the seal and cut assembly 14 back to the fully retracted position of FIGS. 18 and 18A so that the sealed blister package can be removed from the blister nest 74 at the block 214 of the routine 200. After the blister package is remove from the blister nest 74, the routine 200 may advance to a block 216 to determine whether the blister package is the late blister package in the production run. If the last blister package of the production run has been formed, the routine 200 will end. If the production run is continuing at the block 216, the routine 200 will advance to a block 218 where the backing material web 32 is advanced through the seal and cut assembly 14 by the take-up roll 26 so that a new uncut portion of the backing material web 32 is positioned between the nesting tray assembly 20 and the seal and cut tooling assembly 22 and above the position of the blister nest 74 and the next blister tray 2 disposed therein. After the backing material web 32 is advanced to the next position, the routine 200 advances back to the block 204 for insertion of the next blister tray 2 into the blister nest 74.

The seal and cut assembly 14 in accordance with the present disclosure offers benefits over previously-known heat-sealing machines that require precut backing sheets 8. The fabrication process is improved by facilitating automated feeding of the backing material web 32 through the seal and cut assembly 14 as opposed to manually placing the precut backing sheets 8 over the blister tray 2. Consequently, the current risk of precut backing sheets 8 floating and misaligning is eliminated, and structures such as backing sheet alignment pins and their associated design costs may be omitted. This also may allow the use of thinner materials for larger blister packages because the backing sheets 8 are not free to float prior to sealing. Use of the backing material web 32 also ensures that the backing sheets 8 are always facing in the correct direction with the adhesive facing the attachment surfaces 6.

The seal and cut assembly 14 can realize additional cost savings in fabricating the blister packages. Costs associated with precutting the backing sheets 8 are eliminated. It will be much less expensive to create the backing sheets 8 from the backing material web 32 at the time of sealing the blister package as forming an equal number of blister packages from precut backing sheets 8. Additionally, the necessity of maintaining separate inventories of backing sheets 8 each blister package having a different shape or size is eliminated because the varying configurations of the backing sheets 8 can be cut from the same backing material web 32. Use of the backing material web 32 may also allow for integration of a printer upstream of the seal and cut assembly 14 to print the product information on the backing sheets 8 just prior to forming the blister package so that the backing material web 32 is not required to be preprinted, which may also reduce cost.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A seal and cut tooling assembly for a heat sealing machine for forming blister packages, comprising:
    a knife stop plate having a heat seal block opening for receiving a heat seal block of a heater assembly of the heat sealing machine therethrough, wherein the knife stop plate is a single unitary component having a top surface, a bottom surface and no portion extending below the bottom surface;
    a clamping plate having a knife opening and a clamping shoulder extending downward from a bottom surface of the clamping plate and surrounding the knife opening, the clamping plate operatively connected to the knife stop plate to allow movement of the clamping plate toward and away from the knife stop plate;
    a plurality of knife position springs biasing the clamping plate away from the knife stop plate; and
    a knife having a shape complimentary to a backing sheet for a blister package that is heat sealed by the heat sealing machine, the knife being mounted to and extending downward from the bottom surface of the knife stop plate, encircling the heat seal block opening, and aligned within the knife opening such that the plurality of knife position springs are compressed and the knife extends through the knife opening to cut the backing sheet from a backing material web after the clamping shoulder engages a clamping gasket support shoulder of a nesting tray assembly of the heat sealing machine, wherein no portion of the knife stop plate extends downward within an opening defined by the knife, and wherein the heat seal block of the heater assembly passes through the opening defined by the knife to seal the backing sheet to the blister package.

2. The seal and cut tooling assembly according to claim 1, comprising a knife mounting block connecting the knife to the bottom surface of the knife stop plate.

3. The seal and cut tooling assembly according to claim 1, wherein the heat seal block opening has a shape complimentary to the heat seal block that extends through the heat seal block opening.

4. The seal and cut tooling assembly according to claim 1, comprising a spring dock block mounted in a clamping plate top surface of the clamping plate, having a spring recess defined therein, and receiving a knife position spring end of one of the plurality of knife position springs.

5. The seal and cut tooling assembly according to claim 1, comprising a plurality of knife guide bolts connecting the knife stop plate to the clamping plate, wherein each of the plurality of knife guide bolts is received within a corresponding one of the plurality of knife position springs.

6. The seal and cut tooling assembly according to claim 1, comprising an alignment pin extending downward below the bottom surface of the clamping plate, wherein the alignment pin is received by an alignment opening of the nesting tray assembly to align the knife opening with a blister nest of the nesting tray assembly.

7. The seal and cut tooling assembly according to claim 1, wherein the knife stop plate is mounted to a lower support plate of the heater assembly to suspend the seal and cut tooling assembly above the nesting tray assembly.

* * * * *